(12) United States Patent
Hyatt et al.

(10) Patent No.: US 12,340,493 B2
(45) Date of Patent: Jun. 24, 2025

(54) CENTRALIZED ANALYTICS OF MULTIPLE VISUAL INSPECTION APPLIANCES

(71) Applicant: Siemens Aktiengesellschaft, Munich (DE)

(72) Inventors: Yonatan Hyatt, Tel-Aviv (IL); Harel Boren, Givat Shmuel (IL)

(73) Assignee: Siemens Aktiengesellschaft, Munich (DE)

( * ) Notice: Subject to any disclaimer, the term of this patent is extended or adjusted under 35 U.S.C. 154(b) by 527 days.

(21) Appl. No.: 17/297,572

(22) PCT Filed: Dec. 1, 2019

(86) PCT No.: PCT/IL2019/051320
§ 371 (c)(1),
(2) Date: May 27, 2021

(87) PCT Pub. No.: WO2020/110129
PCT Pub. Date: Jun. 4, 2020

(65) Prior Publication Data
US 2021/0398267 A1   Dec. 23, 2021

Related U.S. Application Data

(60) Provisional application No. 62/772,758, filed on Nov. 29, 2018.

(30) Foreign Application Priority Data
Nov. 29, 2018   (IL) .......................................... 263399

(51) Int. Cl.
*G06T 7/00*       (2017.01)
*G05B 19/418*   (2006.01)
(Continued)

(52) U.S. Cl.
CPC ...... *G06T 7/0004* (2013.01); *G05B 19/41875* (2013.01); *G08B 5/22* (2013.01);
(Continued)

(58) Field of Classification Search
CPC ........ G06T 7/0004; G06T 2207/30108; G05B 19/41875; G05B 2219/32181;
(Continued)

(56) References Cited

U.S. PATENT DOCUMENTS 6,661,931 B1   12/2003   Kawada
9,224,070 B1   12/2015   Sundareswara et al.
(Continued)

FOREIGN PATENT DOCUMENTS

KR   101688458     12/2016
WO   2016083897 A2   6/2016

OTHER PUBLICATIONS

Park, et al., "Machine Learning-Based Imaging System for Surface Defect Inspection," International Journal of Precision Engineering and Manufacturing—Green Technology, Jul. 10, 2016, pp. 303-310, vol. 3, No. 3, Springer, New York, USA.
(Continued)

*Primary Examiner* — Xuemei G Chen
(74) *Attorney, Agent, or Firm* — Cozen O'Connor

(57) ABSTRACT

A visual inspection data collection and analysis system comprising: a plurality of visual inspection appliances (VIA) configured to inspect and acquire visual inspection data relating to inspected items; and a data collection and analytics server (DCAS) configured to receive information comprising the visual inspection data from the multiple VIAs and to analyze the received information to form a big data analysis. The VIAs are adapted for detecting defects or gating or counting the inspected items without the involvement of the DCAS.

15 Claims, 3 Drawing Sheets

(51) Int. Cl.
*G08B 5/22* (2006.01)
*H04N 23/56* (2023.01)
*H04N 23/60* (2023.01)

(52) U.S. Cl.
CPC ............... *G05B 2219/32181* (2013.01); *G06T 2207/30108* (2013.01); *H04N 23/56* (2023.01); *H04N 23/60* (2023.01)

(58) Field of Classification Search
CPC .......... G05B 19/00; G08B 5/22; H04N 23/56; H04N 23/60; G01N 21/8851; G06V 2201/06; G07C 3/14; G06F 1/00
See application file for complete search history.

(56) References Cited

U.S. PATENT DOCUMENTS

| | | |
|---|---|---|
| 2002/0180960 A1 | 12/2002 | Katz |
| 2003/0182251 A1 | 9/2003 | Kim et al. |
| 2006/0104788 A1* | 5/2006 | Ban ...................... G06T 1/0014 414/729 |
| 2010/0215246 A1 | 8/2010 | Albeck et al. |
| 2011/0069179 A1* | 3/2011 | Bathiche ................ H04N 7/181 348/207.1 |
| 2012/0128230 A1 | 5/2012 | Meada |
| 2012/0154607 A1 | 6/2012 | Moed et al. |
| 2012/0155741 A1 | 6/2012 | Shibuya |
| 2013/0202200 A1 | 8/2013 | Evan |
| 2015/0064813 A1 | 3/2015 | Ayotte |
| 2015/0131116 A1 | 5/2015 | Sochi |
| 2015/0138325 A1* | 5/2015 | Seo ........................ G01S 7/4812 348/49 |
| 2017/0324933 A1* | 11/2017 | Alrod ................... G06V 40/161 |
| 2018/0276811 A1 | 9/2018 | Wen et al. |
| 2018/0356804 A1* | 12/2018 | Oka ..................... G05B 19/418 |
| 2018/0374022 A1* | 12/2018 | Wang ..................... G06N 20/00 |
| 2018/0374207 A1* | 12/2018 | Niculescu-Mizil ... G06F 18/211 |
| 2019/0073760 A1* | 3/2019 | Wang ...................... G06T 7/001 |
| 2019/0360942 A1* | 11/2019 | Kano ....................... G06N 3/08 |
| 2019/0362480 A1* | 11/2019 | Diao ........................ G06T 7/10 |
| 2019/0362486 A1* | 11/2019 | Diao ..................... G06T 7/0004 |
| 2020/0141908 A1* | 5/2020 | Bingham ............. G01N 29/265 |
| 2021/0014308 A1* | 1/2021 | Larsson .................... G06T 7/70 |
| 2021/0232126 A1* | 7/2021 | Feyo Gebhard . G05B 19/41875 |

OTHER PUBLICATIONS

Natsagdorj et al. Vision-based assembly and inspection system for golf club heads, Robotics and Integrated Manufacturing, Apr. 2015, pp. 83-92, vol. 32, Elsevier Ltd., Amsterdam, Netherlands.

* cited by examiner

CENTRALIZED ANALYTICS OF MULTIPLE VISUAL INSPECTION APPLIANCES

CROSS-REFERENCE TO RELATED APPLICATIONS

This is a U.S. national stage of application No. PCT/IL2019/051320 filed 1 Dec. 2021. Priority is claimed on Provisional Application No. 62/772,758 filed 29 Nov. 2018, and Israeli Application No. 263399 filed 29 Nov. 2018, the contents of which are incorporated herein by reference in their entirety.

FIELD

The present invention relates to visual inspection of items on a production line and more specifically to collection and analysis of data from multiple visual production line inspection appliances.

BACKGROUND

Inspection during production processes helps control the quality of products by identifying defects and then acting upon this detection, for example, by fixing the defect or discarding the defective part. The process of defect detection is essential for quality assurance (QA), gating, and sorting on production lines, and is consequently useful in improving productivity, improving production processes and working procedures, reducing defect rates, and reducing re-work and waste.

Automated visual inspection methods are used in production lines to identify visually detectable anomalies that may have a functional or aesthetic impact on a manufactured part. Due to the underlying technologies that drive them, current visual inspection solutions for production lines are: (1) typically highly customized to a particular product and the particular QA, gating, or sorting task that is addressed; (2) very expensive; (3) very time consuming to set up; (4) require expert selection and integration of hardware, cameras, lighting and software components; and require expert maintenance of these throughout the lifetime of the inspection solution and the production line.

As a result of the intensive costs, human resources, and sheer time requirements, that are associated with tailoring inspection solutions as described above, manufacturing plants are able to deploy only a limited number of such systems. Further, due to the tailored nature of the solutions a single plant may use several inspection systems from different integrators. Gathering data from these disparate systems thus requires a dedicated integration project that itself is tailored and inflexible to integrate the different data formats and protocols of each solution. Therefore, prior art solutions don't provide the capability to share data from different parts of the plants or across multiple plants and thus can't provide comprehensive analysis of the data gathered.

Also, due to the limited number of inspection solutions it is usually not necessary or helpful to centrally analyze the data from the various inspection solutions and each solution stores any inspection data locally. Not correlating the results from the visual inspection systems that are installed in a plant can result in decreased quality resulting in potential loss of reputation and even financial claims against the plant for inferior products.

SUMMARY

The present invention overcomes the drawbacks of the prior art by deploying simplified visual inspection systems that enable gathering of inspection data and enable to determine trends in the production plant. Embodiments of the invention provide multiple automated visual inspection appliances (VIA) for a production plant and a centralized data collection and analytics server (DCAS) that gathers and analyzes data from the VIAs. The DCAS can then provide reports, dashboards and alerts to determine production trends in the manufacturing plant and thus improve the quality and productivity of the plant.

Each VIA can be easily and quickly installed for inspection without significant tailored integration. The ease of setup and operation is enabled by a combination of machine learning, and computer vision algorithms that dynamically adapt to assess the item to be inspected, the target area of inspection, and the characteristics of the surrounding environment effecting the inspection setup.

Each VIA comprises a flexible mounting assembly, a camera assembly which comprises an inspection camera and lighting source, and a controller wherein the inspection camera and lighting source are both connected to and controlled by the controller. The VIAs are in wireless or wired communication with the DCAS.

Once the mount and camera assemblies are installed—a process that does not require skilled staff—the VIA can be initiated. In use, defect free embodiments of items to be inspected are first processed in a setup stage where the controller learns parameters of the items as captured in images by the camera assembly. In some embodiments no database of defects is used and only defect-free items are analyzed during the setup stage. Items to be inspected preferably comprise any item type, shape or material, set in any lighting environment.

In the inspection stage, inspected items, (manufactured items that are to be inspected for inspection tasks, such as, defect detection, gating or sorting purposes), are imaged and the image data collected by the camera from each inspected item is processed by the controller. The controller uses machine learning algorithms which may provide human-level analysis of defects in inspection images preferably even with differing illumination conditions, different reflections, shading, varying location, shape tolerances, etc. This inspection data collected from the VIAs is sent to the DCAS for analysis.

According to some embodiments of the present invention a visual inspection data collection and analysis system, comprises: a plurality of visual inspection appliances (VIA) configured to inspect and acquire visual inspection data relating to inspected items; and a data collection and analytics server (DCAS) configured to receive information comprising the visual inspection data from the multiple VIAs and to analyze the received information to form big data analysis. Preferably the VIAs are adapted for detecting defects or gating or counting the inspected items without the involvement of the DCAS.

Optionally the inspected items are different types of items. Optionally the big data analysis comprises a combination of information related to different types of inspection items. Optionally the DCAS further comprises a display and wherein the DCAS outputs the analysis to the display. Optionally the acquired inspection data from each one of the multiple VIAs is selected from the group consisting of: image/s of the inspected item; record of decision by VIA whether an item has a defect; images of the defects; number of defects; records of deviations from good item samples which are not significant enough to be reported as defects but can imply to issues in the production line; item unique ID; plant work/job order; batch ID; personnel in charge of the production line or station; production tool ID; part name; part serial number; production tool ID; and a combination of the above.

Optionally the data is communicated from a VIA to the DCAS according to timing selected from the group consisting of: after inspection of each item by each VIA; after inspection of a configurable number of items per VIA; after a configurable period of time per VIA; based on a date schedule; based on a time of day schedule; and a combination of the above.

Optionally the analysis is selected from the group consisting of: root cause analysis of detected defects; predictive maintenance analysis—based on detecting trends in defect or deviations that are not defects; intensity of the defects—analysis of trends to increasing occurrences of defects per period of time; significance of the defects—analysis of trends of increasing effect of defects or deviations on the produced item; analysis of product deviations from ideal that are not defects but indicate a trend towards decreasing quality; analysis of defect shape, area and type of defect optionally in the form of a defect "map"; cost of defect—i.e. the cost of discarded items or cost of repair of items determined to be defective; product recall and/or latent product fault vs. defect and/or product deviation history analysis; supplier analysis comparing product raw material suppliers vs defects; and relationship analysis between different production stages of the same item.

Optionally the DCAS is adapted to issue reports based on received inspection data wherein the reports are selected from the group consisting of: % defects detected per item; defect report including images of item showing where defects were detected; % defects detected per manufacturing area; number of items inspected per period of time; personnel vs item defect report; % defects per shift; % defects per manufacturing type (e.g. casting lines vs molding lines); % defects per defect type; defect report per period of time and production area; and a combination of the above.

Optionally the DCAS is adapted to initiate activity on one or more VIAs, the activity selected from the group consisting of: DCAS checks the operational status of one or more VIAs; DCAS checks the software version running on one or more VIAs; DCAS checks the security update status of one or more VIAs; DCAS accesses a real-time view of the inspection images from one or more VIAs; DCAS requests specific data from one or more VIAs; DCAS changes inspection or other settings of one or more VIAs; DCAS performs software upgrades to one or more VIAs; DCAS initiates inspection to be performed by one or more VIAs; DCAS changes the region of interest to be inspected by one or more VIAs; DCAS initiates re-inspection of previously inspected items; DCAS initiates re-inspection of previously inspected items with changed inspection parameters; and a combination of the above.

Optionally the DCAS is adapted to store the received visual inspection data. Optionally the stored inspection data can be searched. Optionally, the DCAS is adapted for issuing alerts based on the analysis. Optionally the DCAS is adapted to run $3^{rd}$ party applications adapted to produce analyses and reports based on the stored inspection data.

As used herein the term "item" refers to a production item wherein production items may be different production stages of the same product or may be different products or different production stages of different products or the same item inspected from different angles. Items may be of any type, shape, size, material, or any other attribute and no example herein should be considered limiting.

As used herein, the term "defect" may include, for example, a visible flaw on the surface of an item, an undesirable size, shape or color of the item or of parts of the item, an undesirable number of parts of the item, a wrong or missing assembly of its interfaces, a broken or burned part, an incorrect alignment of an item or parts of an item, and in general, any difference between a defect free sample and the inspected item. Optionally or additionally a defect is a difference which would be evident to a human user between a defect free item (and/or group of defect free items) and a same-type inspected item. In some embodiments a defect may include flaws which are visible only in enlarged or high resolution images, e.g., images obtained by microscopes or other specialized cameras.

Inspection of items as described herein should also be understood as inspection for purposes of defect detection, gating and/or sorting. Where one of these terms is used e.g.: "defect detection" this should be understood as referring to any one of inspection tasks, such as, defect detection, gating, or sorting.

A plant as used herein refers to a manufacturing environment which contains one or more production lines or production areas for manufacture, assembly, testing, packaging or any other type of industrial processing of items.

The processes described below refer, for simplicity, to "images", however it should be appreciated that the processes described herein may be carried out on image data other than or in addition to full images. The term "images" also includes video captured by the cameras of the presently described system.

The term "product stage" as used herein should be understood to include any of an assembly stage (items are assembled into a product), manufacturing stage (items are subjected to a form of processing as part of product manufacture), and/or inspection stage (stages are actually different views or sections of the same product). As used herein product stages are related to one another by their being production stages or aspects of a product. The term item may be used to refer to a product stage. As used herein a "product" may refer to a completed commercial product but may also refer to a manufactured item or part that is destined for integration into a product.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer, or similar electronic computing device as defined below, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

As used herein the terms "machine learning" or "artificial intelligence" refer to use of algorithms on a computing device that parse data, learn from this data, and then make a determination, where the determination is not deterministically replicable (such as with deterministically oriented software as known in the art).

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1A:
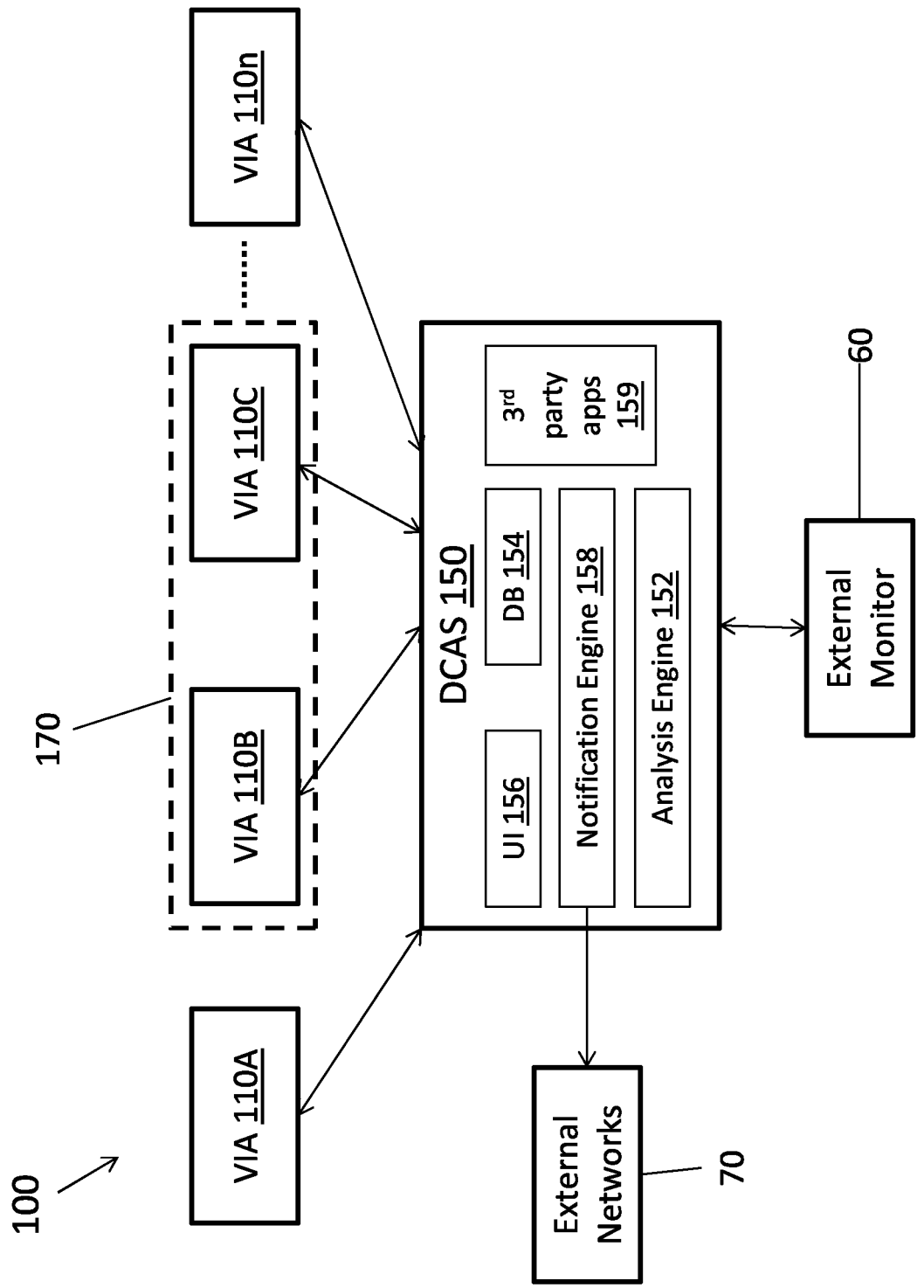
FIGS. 1A-1B are illustrative schematic drawings showing collection of data from automated visual inspection appliances on a production line according to at least some embodiments of the present invention.
Figure 1B:
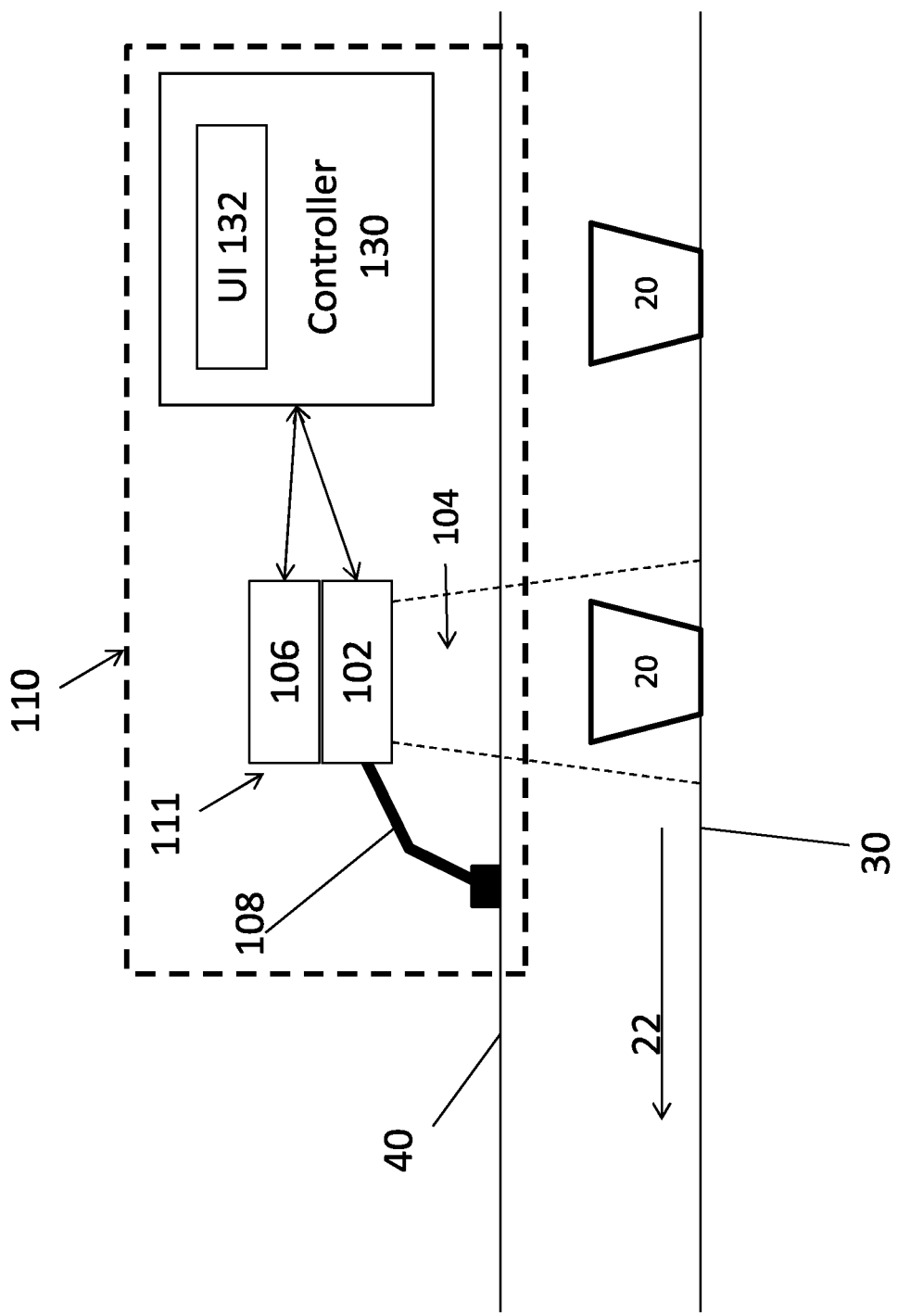

The present invention in at least some embodiments is for a system comprising multiple automated visual inspection appliances (VIA) for a production plant and a centralized data collection and analytics server (DCAS) that gathers and analyzes data from the VIAs. Reference is now made to FIGS. 1A-1B which are illustrative schematic drawings showing collection of data from automated visual inspection appliances on a production line according to at least some embodiments of the present invention. As shown in FIG. 1A an automated visual inspection system 100 comprises multiple visual inspection appliances (VIA) 110A, B,C, n in communication with a data collection and analytics server (DCAS) 150. Although four VIAs 110A, 110B, 110C and 110n are shown, it should be appreciated that any number of VIAs may be in communication with DCAS 150. VIA is preferably provided as an integrated appliance for use in a manufacturing environment or plant. VIAs 110A, B,C, n are optionally installed in one plant or optionally multiple VIAs are installed in multiple plants. Each VIA connects to DCAS 150 using wired or wireless communications protocols and methods as known in the art.

DCAS 150 is a computing device as defined above and may optionally comprise a server, distributed server, cloud computing environment, data cluster or any other suitable computing device. DCAS 150 preferably comprises analysis engine 152, database (DB) 154, DCAS user interface (UI) 156, and notification engine 158.

Analysis engine 152 receives data from VIAs 110A, B, C and n and analyses the received data to output insights, recommendations, summaries, trends, alerts, and root cause analysis of defects all related to the items inspected and the production environment as described below. Analysis engine 152 optionally uses big data analysis methods.

DB 154 is a database (e.g., as known in the art) and stores data transmitted by VIAs 110A, B, C and n and also results and interim results of analysis by engine 152. DB 154 also stores configuration data defined in DCAS 150 for system 100 including VIA profiles. A VIA profile includes information about each VIA in system 100 including but not limited to: unique identifier, name, physical mounting details, position in plant, plant geolocation, items inspected, reference images of items inspected, profiles of items inspected, inspection results and so forth. Optionally a manufacturing area 170 is defined for DCAS 150 where each manufacturing area 170 includes one of more VIAs. A manufacturing area 170 optionally comprises VIAs from one plant or optionally comprises VIAs from multiple plants. The manufacturing area 170 defined in FIG. 1A includes VIAs 110B and 110C but it should be appreciated that any number or any of VIAs could be included in a manufacturing area 170 and any number of manufacturing areas 170 may be defined for DCAS 150. Where more than one manufacturing area 170 is defined these manufacturing areas 170 may optionally overlap, i.e.: a single VIA may optionally be part of several manufacturing areas 170.

DCAS UI 156 enables display of the results of analysis engine 152 and also interaction with DCAS 150 by a human operator (not shown). DCAS UI 156 optionally comprises a monitor or screen and information provided to a user of DCAS 150 may be visual (e.g., text or other content displayed on the monitor). Alternatively or additionally, DCAS UI 156 comprises an audio player to emit a sound. DCAS UI 156 preferably enables accepting user input such as by a touch screen, keyboard and/or mouse. Optionally, DCAS UI 156 is provided on a multi-purpose device such as a smartphone, tablet or personal computer in communication with DCAS 150. Optionally DCAS UI 156 can be accessed remotely optionally from within the plant where it operates and outside of the plant where it operates.

Notification engine 158 is in communication with external communication networks 70 and provides push notification of alerts or other outputs from analysis engine 152. Non-limiting types of notification methods include email, SMS, WhatsApp or any mobile notification mechanism. Notification engine 158 can be configured via DCAS UI 156 to define recipients and notification methods for different types of alerts, reports or analyses.

In some embodiments, VIAs 110A, B, C, n and DCAS 150 communicate over the external network 70. DCAS 150 may automatically detect when a VIA is connected to the external network 70 and may then register the newly connected VIA and perform data collection and analysis of the VIA performance and of data obtained by the VIA, as described herein.

Thus, in one embodiment, a visual inspection data collection and analysis system, includes a plurality of VIAs configured to acquire visual inspection data relating to inspected items, and a central server, such as a DCAS configured to identify a newly connected VIA on a communications network, to register the newly connected VIA and enable data collection and analysis of each registered VIA.

The DCAS 150 may identify each VIA based on an ID, IP address or other unique identifiers connected to each VIA and each VIA may be registered under a unique identifier. Data collection and analysis of each registered VIA may be done according to the registered unique identifier. E.g., data from VIAs registered under an identifier related to inspection line A may be analyzed differently from data from VIAs registered under an identifier related to inspection line B.

DCAS 150 may detect when a VIA is connected to the external network 70 based on signals sent over the network (e.g., ethernet) by DCAS 150 and/or VIAs 110A, B, C and n. Signals may include, for example, packets transmitted by multicast addressing using, for example User Datagram Protocol (UDP). Based on the signals, which may be transmitted periodically by the DCAS and/or VIA, the DCAS can determine that a VIA is connected to the network and the DCAS may then compare the VIA identifier to already registered VIA identifiers to determine if the VIA is newly connected or not.

DCAS 150 may perform one or more different actions for each registered VIA, as described herein. For example, collecting visual inspection data and the timing of the collection of data may be done based on the registered VIA identifier. Storing the received data, analysis of the received data and issuing reports may be controlled based on the registered VIA identifier. The DCAs may initiate different activities in each VIA based on the registration of each VIA.

DCAS 150 is optionally in communication with an external monitoring system 60. Monitoring system 60 is a computing device as described above. Monitoring system 60 is typically a production plant management system such as for gathering and monitoring key performance indicators for manufacturing efficiency. Monitoring system 60 is optionally a production resource management platform.

DCAS 150 optionally runs $3^{rd}$ party applications 159 where $3^{rd}$ party application 159 are operative to produce analyses and reports based on the collected data, which may be stored in DCAS 150. Optionally the $3^{rd}$ party applications 159 can operate VIAs according to the capabilities of DCAS 150.

As shown in FIG. 1B each VIA 110 comprises a controller 130, camera assembly 111, and mounting assembly 108. Camera assembly 111 comprises camera 102, and light source 106.

Camera 102 comprises a CCD or CMOS or other appropriate imaging chip. Camera 102 is a 2D camera or optionally a 3D camera. Optionally camera 102 comprises the camera integrated into a mobile device such as a smartphone or tablet where the device is attached to mounting assembly 108. Camera 102 optionally comprises a polarizing lens, tele-centric lens, narrow band, zoom lens, or other lens (not shown) placed over the lens of camera 102 or directly upon its imaging chip.

Light source 106 comprises LEDs or other known light source. The intensity (brightness) of light source 106 can be adjusted. Optionally, the color of light source 106 can be adjusted. Optionally, light source 106 comprises multiple controllable segments, each of which can be activated or provided with the same or different intensity and/or color. For example, but without intention to be limiting, light source 106 may comprise a circular array of LEDs surrounding camera 102 lens, where radial portions of circular light source 106 are controlled individually or alternatively the intensity and/or color of every LED or groupings of LEDs, can be controlled individually.

Light source 106 is shown as positioned above camera 102 for simplicity of the figures but this position should not be considered limiting. Optionally, light source 106 is mounted on the side of or below camera 102. Light source 106 is preferably attached to and surrounds or is otherwise fixed in relation to the lens of camera 102 so as to illuminate the field of view (FOV) 104 of camera 102 or portions thereof. Camera assembly 111 is attached to mounting assembly 108. Alternatively, camera 102 and light source 106 are separately attached to mounting assembly 108 allowing individual adjustment of the spatial position of either.

Mounting assembly 108 comprises mounts, segments and fasteners allowing adaptation and adjustment of mounting assembly 108 for optimal positioning of camera 102 and light source 106 for inspection of an item.

Camera assembly 111 is positioned using mounting assembly 108 such that items 20 to be inspected are within the field of view 104 of camera 102. Mounting assembly 108 is attached to a mounting surface 40. Surface 40 may remain in a fixed position relative to item 20 or alternatively may move so as to repeatedly bring camera assembly 111 into a position where items 20 to be inspected are within the field of view 104 of camera 102. A non-limiting example of a moving surface 40 is a robot arm. Where reference is made to FOV 104 herein it is to be understood that light source 106 is positioned to illuminate FOV 104. Surface 40 optionally comprises an aluminum profile including grooves for attachment of mounting brackets.

Items 20 to be inspected may be placed on an inspection line 30 which comprises means for supporting and moving items 20 such as but not limited to a conveyor belt, or a cradle or another holding apparatus, moving in direction 22, such that first item 20 is brought into FOV 104 followed by second item 20 which is brought into FOV 104, and so forth. Alternatively, items 20 are successively placed in FOV 104 and then removed such as by a robot or human operator.

Camera 102 and light source 106 are in communication with controller 130. Controller 130 is a computing device as defined herein. Controller 130 comprises one or more processors (not shown) such as but not limited to a central processing unit (CPU), a graphics processing unit (GPU), a digital signal processor (DSP), a microprocessor, a controller, a chip, a microchip, an integrated circuit (IC), or any other suitable multi-purpose or specific processor or controller. Controller 130 activates light source 106 or any of its components or controllable segments as described above, which may or may not be activated depending on the item being imaged or the inspection lighting environment. Controller 130 preferably alters the intensity or color of light source 106 depending on the item being imaged or the inspection lighting environment. Controller 130 preferably alters the intensity or color of light source for regions of particular interest within the illuminated area.

Controller 130 further comprises a memory unit (not shown) which stores executable instructions that, when executed by the processor, facilitate performance of operations of the processor. The memory unit may also store at least part of the image data received from camera 102. Non-limiting examples of memory units include random access memory (RAM), dynamic RAM (DRAM), flash memory, volatile memory, non-volatile memory, cache memory, a buffer, a short term memory unit, a long term memory unit, or other suitable memory units or storage units.

Controller 130 further comprises a VIA user interface (UI) 132. VIA UI 132 may comprise a monitor or screen and notifications to a user may be visual (e.g., text or other content displayed on the monitor). Alternatively or additionally, VIA UI 132 comprises a light that may light up or change color. Alternatively or additionally, VIA UI 132 comprises an audio player to emit a sound. VIA UI 132 preferably enables accepting user input such as by a touch screen, keyboard and/or mouse. Optionally, VIA UI 132 is provided on a multi-purpose device such as a smartphone, tablet or personal computer.

Optionally DCAS 150 can check the operation status of one or more VIAs 110. Optionally DCAS 150 can check the software version running on one or more VIAs 110. Optionally DCAS 150 can check the security status of VIAs (e.g., that one or more VIAs 110 are updated with the most recent security updates). Optionally an operator can use DCAS 150 to access a real-time view of the inspection images from any VIA 110 for display on DCAS UI 156. Optionally an operator can use DCAS 150 to request specific data from any one or more of VIAs 110. Optionally DCAS 150 can change inspection or other settings of any one or more of VIA 110. Optionally DCAS 150 can perform software upgrades of any one or more of VIA 110. Optionally DCAS 150 can initiate inspection to be performed by any one or more of VIA 110. Optionally, DCAS 150 can change the region of interest to be inspected by any one or more of VIA 110. Optionally DCAS 150 can initiate re-inspection of previously inspected items further optionally with changed inspection parameters.

Figure 2:
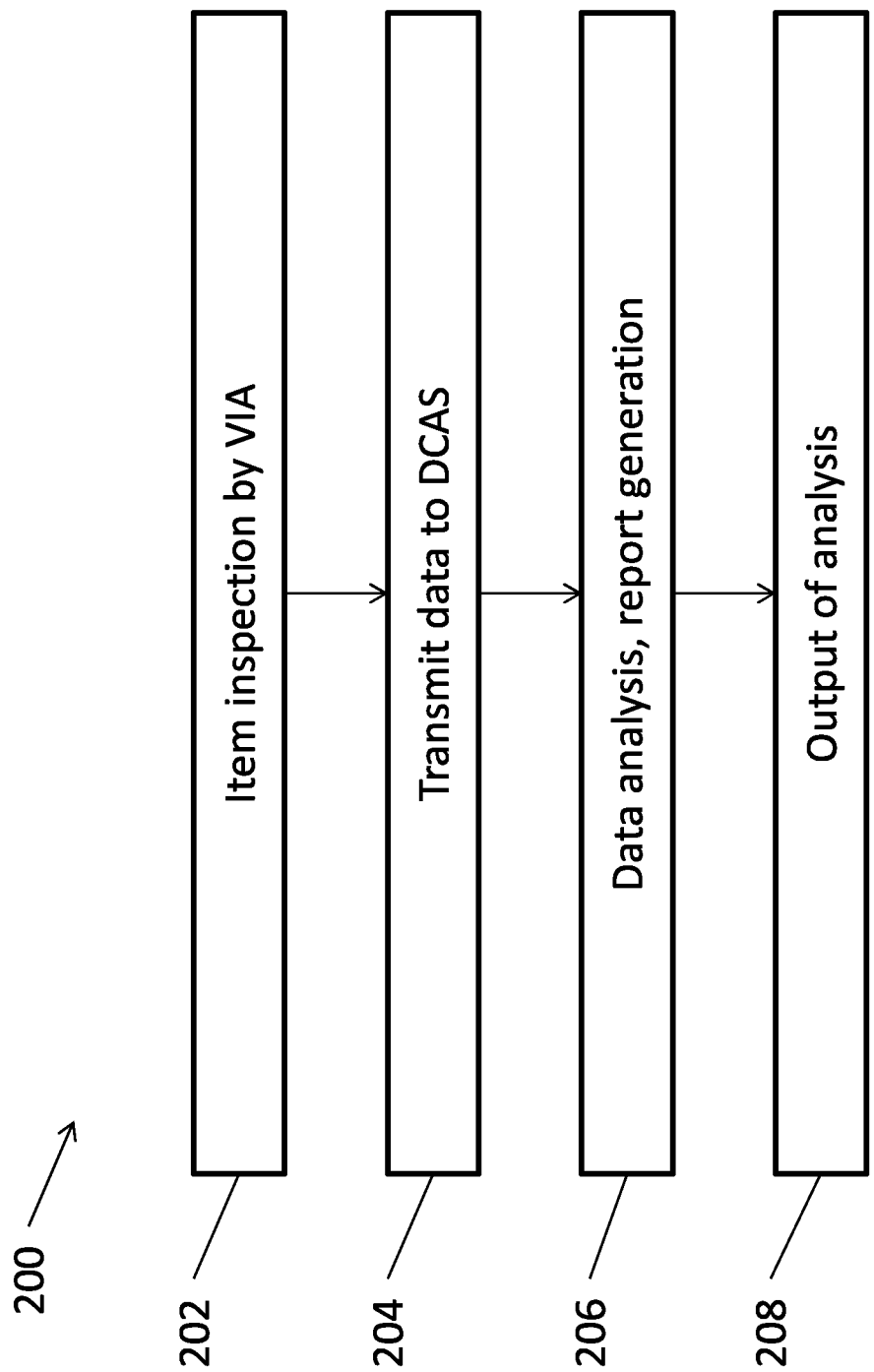
FIG. 2 is a flow diagram showing a process for collection of data from automated visual inspection appliances on a production line according to at least some embodiments of the present invention.

Reference is now made to FIG. 2 which is a flow diagram showing collection of data from automated visual inspection appliances on a production line according to at least some embodiments of the present invention. Use of automated visual inspection system 100 preferably proceeds according to process 200 as shown in FIG. 2. Before process 200 can begin, VIA 110 is set up to enable inspection of items 20. System 100 requires setup for each type of item or stage of item that is to be inspected. In the setup step, preferably at least two or more defect free samples of a manufactured item 20 of the same type are placed in succession within field of view 104 of camera 102. Each defect free sample of item 20 is imaged by camera 102. These images, which may be referred to as setup images, are optionally obtained by using different imaging parameters of camera 102 and lighting parameters of light source 106. The images comprise image data such as pixel values that represent the intensity of reflected light as well partial or full images or videos.

The setup images are analyzed by controller 130 using machine learning/artificial intelligence (AI) and computer vision algorithms to create a complete representation of item 20 used for defect detection, gating, sorting and/or other inspection tasks, on the production line. Following the setup step and based on the information collected from the sample, defect-free items, the inspection process can begin and controller 130 can preferably detect and inspect further items of the same type even if these further items were never previously presented, and determine whether these are defect-free. It should be noted that the inspection of items 20 for defect detection (determination of whether the item 20 is defect free or has a defect) or gating or sorting or counting can be performed by VIA 110 independently of DCAS 150.

In step 202, items 20 are inspected by each VIA 110 for defect detection, gating, or sorting purposes. The following data is collected by each VIA 110 per item 20 as a result of the inspection process. This data is herein referred to as "per-item collected data", and one or more of per-item collected data is referred to as "collected data":

Image/s of the inspected item;
    Record of decision by VIA whether item has a defect;
    Image of the defects;
    Number of defects;
    Records of deviations from good item samples which are not significant enough to be reported as defects but can imply to issues in the production line;
    Item unique ID;
    Plant Work/Job order/Batch ID;
    Personnel in charge of the production line or station;
    Production tool ID (Die or molder, etc.).
    Part Name
    Part Serial Number
    Inspection Profile ID In step 204 the collected data is transmitted by each VIA 110 to DCAS 150. As above the communication between VIA 110 and DCAS 150 may use standard communication infrastructure and protocols as known in the art. Collected data is stored in DB 154. Collected data is transmitted by VIA 110 to DCAS 150 according to one or more of the following:

After inspection of each item by each VIA;
    After inspection of a configurable number of items per VIA;
    After a configurable period of time per VIA;
    Based on Date/Time schedule;
    Based on a combination of the above.

Collected data stored in DB 154 can preferably be searched and queried via DCAS UI 156, DB 154 of DCAS 150 functioning as an archive. A non limiting example of such a query is a search for images and other inspection data related to a specific item indexed by an item identifier such as but not limited to the item barcode or serial number.

In step 206 the collected data from VIAs 110 is analyzed by analysis engine 152 and/or used for generating reports. The analyses or use of collected data of step 206 optionally take place immediately following step 204. Alternatively, step 206 takes place some time after step 204. Reports and/or analyses are preferably generated using big data methods. Optionally the analysis is performed for a combination of different type items where different type items may be any of different products, different production stages, different plants, or different industries. One or more of the following reports are preferably generated including but not limited to:

% defects detected per item;
    Defect report including images of item showing where defects were detected;
    % defects detected per manufacturing area;
    Number of items inspected per period of time;
    Personnel vs item defect report;
    % defects per shift;
    % defects per manufacturing type (e.g. casting lines vs molding lines);
    % defects per defect type;
    Defect report per period of time and production area;

One or more of the following analyses are preferably performed including but not limited to:

Root cause analysis of detected defects;
    Predictive Maintenance analysis—based on detecting trends in defect or deviations that are not defects;
    Intensity of the defects—analysis of trends to increasing occurrences of defects per period of time;

Significance of the defects—analysis of trends of increasing effect of defects or deviations on the produced item;

Analysis of product deviations from ideal that are not defects but indicate a trend towards decreasing quality;

Analysis of defect shape, area and type of defect optionally in the form of a defect "map";

Cost of defect—i.e. the cost of discarded items or cost of repair of items determined to be defective;

Product recall and/or latent product fault vs. defect and/or product deviation history analysis;

Supplier analysis comparing product raw material suppliers vs defects;

Relationship analysis between different production stages of the same item.

The analysis or reporting of step 206 preferably takes place based on one or more of:

Periodic for set periods of time which are preferably configured independently per analysis;

Operator initiated where an operator of DCAS 150 defines and initiates a specific analysis or report;

Analysis and/or reporting per number of items inspected performed after a specific number of items have been inspected by a specific VIA 110 or specific manufacturing area 170.

In step 208 the results of the analyses and/or reports of step 206 are stored in DB 154 and also preferably displayed using DCAS UI 156. Optionally, results are exported to external systems such as but not limited to external monitor 60. Optionally results are displayed on a configurable dashboard presented on DCAS UI 156. Optionally results of step 206 generate alerts which are displayed on DCAS UI 156 or communicated to an operator of DCAS 150 such as via notification engine 158 sending, for example but not limited to, text or other messages to a mobile device. A non-limiting example of an alert is "% defects detected in a production area exceeding a defined threshold".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A visual inspection data collection and analysis system, comprising:
   a. a plurality of visual inspection appliances (VIA) configured to acquire visual inspection data relating to inspected items, each of the plurality of VIAs comprising a flexible mounting assembly, an inspection camera, a lighting source and a controller, the inspection camera and the lighting source being connected to and controlled by the controller; and
   b. a data collection and analytics server (DCAS) in communication with the plurality of VIAS over a communications network and configured to:
      receive the visual inspection data from at least one of said multiple VIAs;
      automatically detect and register under a unique identifier a new VIA connecting to the network, based on a signal sent over the network from either one or both of the new VIA and DCAS;
      receive visual inspection data from the new VIA; and
      initiate an activity in the new VIA based on the unique identifier;
   wherein defect free items are processed in a setup stage in which the controller learns parameters of the defect free items captured in images obtained by the inspection camera.

2. The system of claim 1, wherein the activity comprises one or a combination of: collecting visual inspection data, timing collection of the visual inspection data, storing received data, analysis of the received data and issuing reports.

3. The system of claim 1, wherein the activity is selected from the group consisting of one or a combination of:
   a. DCAS checks operational status of the new VIA;
   b. DCAS checks software version running on the new VIA;
   c. DCAS checks security status of the new VIA;
   d. DCAS accesses a real-time view of an inspected item from the new VIA;
   e. DCAS requests specific data from the new VIA;
   f. DCAS changes inspection or other settings of the new VIA
   g. DCAS performs software upgrades to the new VIA;
   h. DCAS initiates inspection to be performed by the new VIA;
   i. DCAS changes a region of interest to be inspected by the new VIA;
   j. DCAS initiates re-inspection of previously inspected items; and
   k. DCAS initiates re-inspection of previously inspected items with changed inspection parameters.

4. The system of claim 1, wherein the DCAS is configured to receive the visual inspection data from the plurality of VIAS and to analyze said received information to form a big data analysis.

5. The system of claim 4, wherein the inspected items are different types of items.

6. The system of claim 5, wherein the big data analysis comprises a combination of information related to the different types of items.

7. The system of claim 4, further comprising:
   a display;
   wherein said DCAS outputs said analysis to said display.

8. The system of claim 4, wherein said analysis is selected from the group consisting of:
   a. root cause analysis of detected defects;
   b. predictive maintenance analysis;
   c. intensity of defects;
   d. significance of defects;
   e. analysis of product deviations from ideal that are not defects but indicate a trend towards decreasing quality;
   f. analysis of defect shape, area and type of defect;
   g. cost of defect;
   h. product recall, latent product fault vs. defect or product deviation history analysis;
   i. supplier analysis comparing product raw material suppliers vs defects; and
   j. relationship analysis between different production stages of a same item.

9. The system of claim 4, wherein said DCAS is configured to issue reports based on received inspection data; and wherein said reports are selected from the group consisting of:
a. % defects detected per item;
b. defect report including images of item showing where defects were detected;
c. % defects detected per manufacturing area;
d. number of items inspected per period of time;
e. personnel vs item defect report;
f. % defects per shift;
g. % defects per manufacturing type;
h. % defects per defect type;
i. defect report per period of time and production area; and
j. a combination of the above.

10. The system of claim 4; wherein said DCAS is configured to store said received visual inspection data; and wherein the stored inspection data is searchable.

11. The system of claim 10, wherein said DCAS is configured to execute third-party applications to produce analyses and reports based on said stored inspection data.

12. The system of claim 4, wherein said DCAS is configured to issue alerts based on said analysis.

13. The system of claim 1, wherein the visual inspection data from each of the plurality of VIAs is selected from the group consisting of:
a. images of an inspected item;
b. record of decision by VIA whether an item has a defect;
c. image of the defects;
d. number of defects;
e. records of deviations from good item samples which are not significant enough to be reported as defects but can imply issues in a production line;
f. item unique ID;
g. plant work/job order;
h. batch ID,
i. personnel in charge of a production line or station;
j. production tool ID;
k. part name;
l. part serial number;
m. production tool ID; and
n. a combination of the above.

14. The system of claim 1, wherein said visual inspection data is communicated from a VIA to said DCAS in accordance with timing selected from the group consisting of:
a. after inspection of each item by each VIA;
b. after inspection of a configurable number of items per VIA;
c. after a configurable period of time per VIA;
d. based on a date schedule;
e. based on a time of day schedule; and
f. a combination of the above.

15. The system of claim 1, wherein the controller utilizes machine learning/artificial intelligence (AI) and computer vision algorithms to analyze the images and to create a representation of the defect free items for at least one of defect detection, gating, sorting and other inspection tasks on a production line.

* * * * *